US010186086B2

(12) United States Patent
Giraldi et al.

(10) Patent No.: US 10,186,086 B2
(45) Date of Patent: Jan. 22, 2019

(54) AUGMENTED REALITY CONTROL OF COMPUTING DEVICE

(71) Applicant: MICROSOFT TECHNOLOGY LICENSING, LLC, Redmond, WA (US)

(72) Inventors: Riccardo Giraldi, Seattle, WA (US); Anatolie Gavriliuc, Kirkland, WA (US); Michelle Chua, Seattle, WA (US); Andrew Frederick Muehlhausen, Seattle, WA (US); Robert Thomas Held, Seattle, WA (US); Joseph van den Heuvel, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 112 days.

(21) Appl. No.: 14/843,761

(22) Filed: Sep. 2, 2015

(65) Prior Publication Data

US 2017/0061694 A1 Mar. 2, 2017

(51) Int. Cl.
*G09G 5/00* (2006.01)
*G06T 19/00* (2011.01)
*G06F 3/01* (2006.01)
*G02B 27/01* (2006.01)
*G06F 3/16* (2006.01)
(Continued)

(52) U.S. Cl.
CPC .......... *G06T 19/006* (2013.01); *G02B 27/017* (2013.01); *G06F 3/013* (2013.01); *G06F 3/017* (2013.01); *G06F 3/04842* (2013.01); *G06F 3/16* (2013.01); *H04N 5/23229* (2013.01); *G02B 2027/0178* (2013.01); *G06F 2203/0381* (2013.01)

(58) Field of Classification Search
None
See application file for complete search history.

(56) References Cited

U.S. PATENT DOCUMENTS

2008/0005702 A1  1/2008  Skourup et al.
2009/0300535 A1  12/2009  Skourup et al.
(Continued)

OTHER PUBLICATIONS

Yasumuro, et al., "Consistent Presentation of Interactive Virtual Objects in Real Space with 3D Markers—Interactive Virtual Interior Design", in Proceedings of VIIth Digital Image Computing: Techniques and Applications, Dec. 10, 2003, pp. 653-662.
(Continued)

*Primary Examiner* — Stephen T Reed
(74) *Attorney, Agent, or Firm* — Alleman Hall Creasman & Tuttle LLP

(57) ABSTRACT

An augmented reality head-mounted device includes a gaze detector, a camera, and a communication interface. The gaze detector determines a gaze vector of an eye of a wearer of the augmented reality head-mounted device. The camera images a physical space including a display of a computing device. The communication interface sends a control signal to the computing device in response to a wearer input. The control signal indicates a location at which the gaze vector intersects the display and useable by the computing device to adjust operation of the computing device.

20 Claims, 7 Drawing Sheets

(51) Int. Cl.
*H04N 5/232* (2006.01)
*G06F 3/0484* (2013.01)

(56) References Cited

U.S. PATENT DOCUMENTS

| | | |
|---|---|---|
| 2010/0164990 A1 | 7/2010 | Van Doorn |
| 2012/0113223 A1 | 5/2012 | Hilliges et al. |
| 2012/0249416 A1* | 10/2012 | Maciocci ............... G06F 3/011 |
| | | 345/156 |
| 2012/0272179 A1 | 10/2012 | Stafford |
| 2013/0207963 A1 | 8/2013 | Stirbu et al. |
| 2013/0265229 A1 | 10/2013 | Forutanpour et al. |
| 2013/0321271 A1 | 12/2013 | Bychkov et al. |
| 2013/0328925 A1* | 12/2013 | Latta ..................... G09G 3/003 |
| | | 345/633 |
| 2013/0335405 A1 | 12/2013 | Scavezze et al. |
| 2014/0002444 A1* | 1/2014 | Bennett ................. G06F 3/012 |
| | | 345/419 |
| 2014/0049559 A1* | 2/2014 | Fleck .................... G03H 1/2249 |
| | | 345/633 |
| 2014/0237366 A1* | 8/2014 | Poulos ................... G06F 3/013 |
| | | 715/728 |
| 2014/0253432 A1 | 9/2014 | Ferguson |
| 2014/0320389 A1 | 10/2014 | Scavezze et al. |
| 2015/0013018 A1 | 1/2015 | Yan |
| 2015/0061998 A1 | 3/2015 | Yang et al. |
| 2015/0193018 A1* | 7/2015 | Venable ................ G06F 3/0346 |
| | | 345/158 |
| 2016/0048964 A1* | 2/2016 | Kruglick ............... G06T 7/0044 |
| | | 345/633 |

OTHER PUBLICATIONS

ISA European Patent Office, International Search Report and Written Opinion Issued in PCT Application No. PCT/US2016/045447, dated Oct. 14, 2016, WIPO, 10 pages.

"Second Written Opinion Issued in PCT Application No. PCT/US2016/045447", dated Jul. 6, 2017, 8 Pages.

"International Preliminary Report on Patentability Issued in PCT Application No. PCT/US2016/045447", dated Oct. 13, 2017, 9 Pages.

* cited by examiner

AUGMENTED REALITY CONTROL OF COMPUTING DEVICE

BACKGROUND

Various types of user input mechanisms may be employed to provide control signals to a computing device. In one example, natural user input may be used as a mechanism of interaction to provide control signals to a computing device. In particular, a user may perform various physical actions (e.g., physical gestures, eye gaze, voice commands) that may be translated into control signals to control a computing device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A head-mounted device includes a gaze detector, a camera, and a communication interface. The gaze detector determines a gaze vector of an eye of a wearer of the head-mounted device. The camera images a physical space including a display of a computing device. The communication interface sends a control signal to the computing device in response to a wearer input. The control signal indicates a location at which the gaze vector intersects the display and is useable by the computing device to adjust operation of the computing device.

DETAILED DESCRIPTION

A computing device may be controlled via a variety of different user input mechanisms. For example, a single computing device may be programmed to both visually present a graphical user interface and receive input commands from a user input device directly connected to the computing device (e.g., touch-sensitive display, computer mouse, touch pad, track ball, keyboard, etc.). With a single computing device handling all of the user interface processing and all of the user input processing, it is relatively trivial to associate a particular user input to a particular user interface object. However, in some cases, it may be desirable to control a computing device with another device that does not have complete knowledge of the user interface and/or the computing functions that are currently available to be controlled.

Accordingly, the present disclosure relates to an approach for virtually interacting with a computing device by providing user input to the computing device via an augmented-reality device. In particular, a user's gaze is assessed relative to another computing device's user interface. Information relating to the gaze is communicated to the other computing device and used to control the other computing device. This type of control can be enacted even when the augmented reality device does not have full knowledge of the user interface being visually presented by the other computing device. According to such an approach, a user may control operation of a computing device without having to provide user input to a user input mechanism that is directly tied to the computing device. For example, in the case of a touch-sensitive display, the user may control visual presentation of the display without having to be near enough to the display to provide touch input.

Furthermore, such an approach may be extended to allow a user to virtually interact with a plurality of different displays of different computing devices. In particular, the augmented-reality device may translate the user input into different control signals that may be recognized by the particular computing device with which the user is interacting. Accordingly, the user may interact with each of the different computing devices in a unified manner without having to use different user input mechanism that are directly tied to each of the plurality of different computing devices.

Figure 1A:
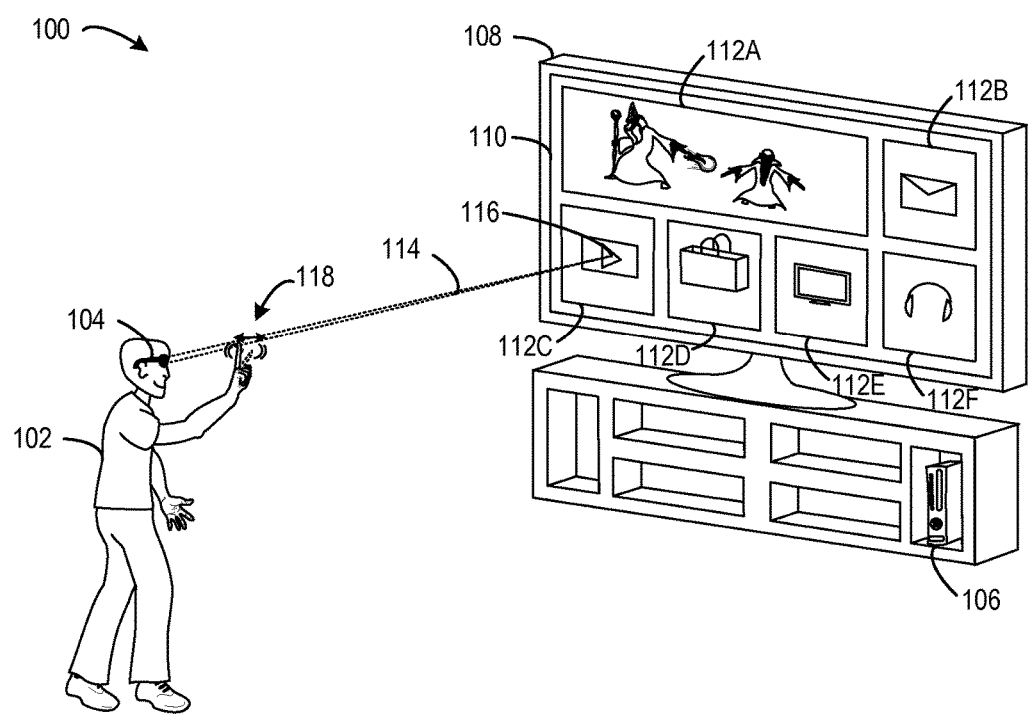
FIGS. 1A-1C shows an example interaction of a user performing a hand gesture that is recognized by an augmented-reality device to control a different device.
Figure 1B:
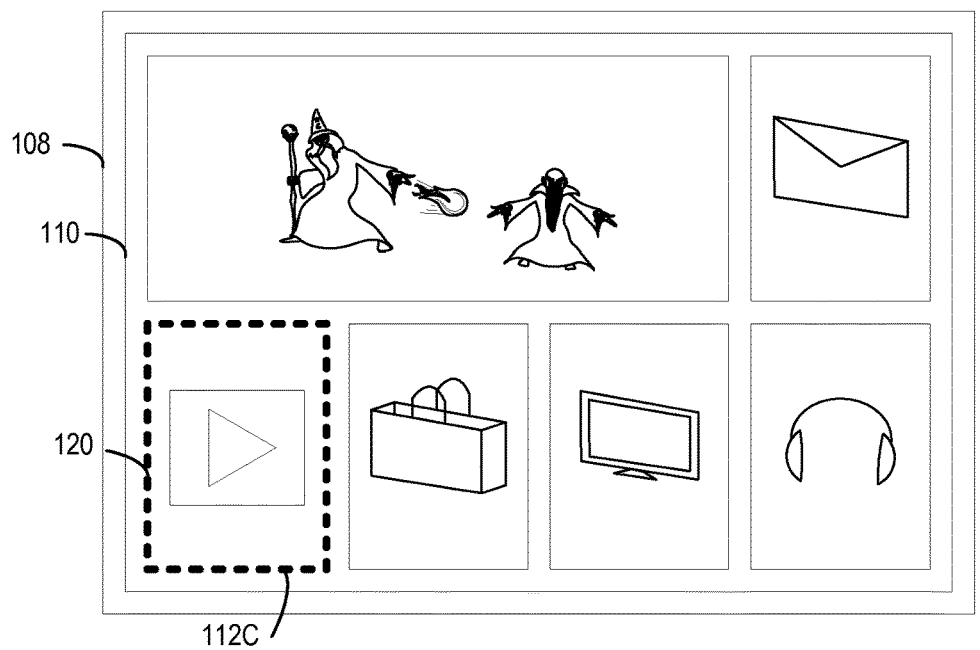
Figure 1C:
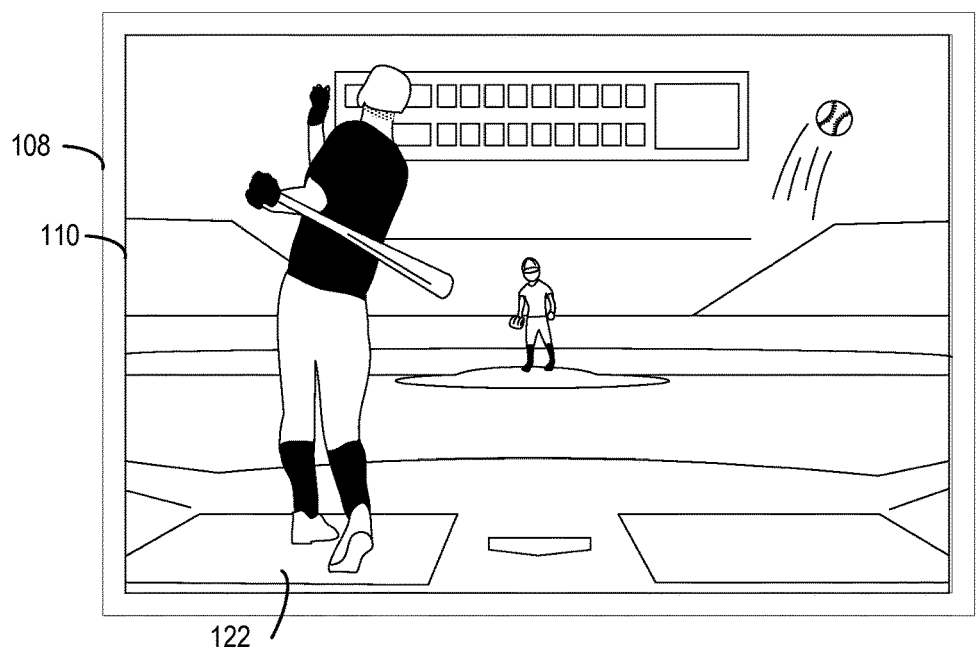

FIGS. 1A-1C show an example physical space 100 in which a user 102 is wearing an augmented-reality device in the form of a head-mounted, see-through display device (referred to herein as a head-mounted display (HMD)) 104. The physical space 100 includes a computing device 106 configured to control visual presentation of a display 108. The display 108 visually presents a user interface 110 including a plurality of user interface objects 112 (e.g., 112A, 112B, 112C, 112D, 112E, 112F). The user interface 110 may be visible to the user 102 within a field of view of the HMD 104. Furthermore, the user interface 110 may be visible to other users in the physical space 100 that are not using an augmented-reality device to view the physical space 100. The user interface 110 may include any suitable user interface object including icons, images, videos, and other visual representations.

In the illustrated example, each of the plurality of user interface objects 112 may be selectable, via user input, to cause the computing device 106 to perform a different operation. For example, the user interface object 112A may be selected to play a video game, the user interface object 112B may be selected to open an email application, the user interface object 112C may be selected to play a video, the user interface object 112D may be selected to open a shopping application, the user interface object 112E may be selected to watch television, and the user interface object 112F may be selected to listen to music.

In this example, the user (or wearer) 102 may virtually interact with the user interface 110 via natural user input in the form of a combination of eye gaze and wearer input. Such natural user input may be recognized, via various sensing componentry of the HMD 104. In particular, the HMD 104 may include a gaze detector that determines a gaze vector 114 of an eye of the wearer 102. Further, the HMD 104 may include an outward-facing camera that images the physical space 100. The HMD 104 may determine a location 116 at which the gaze vector 114 intersects the display 108 based on images obtained via the camera. Various componentry of the HMD will be discussed in further detail below with reference to FIG. 5.

In order to distinguish whether the wearer 102 is merely examining the user interface 110 or whether the wearer 102 desires to select a user interface object 112 (or interact with the user interface 110 in another manner), the HMD 104 may be configured to recognize a wearer input. The wearer input may trigger the HMD 104 to send control signals to the computing device 106 to adjust operation based on the gaze vector 114 of the wearer 102 while the wearer 102 is performing the wearer input.

As shown in FIG. 1A, the wearer 102 may express an intent to play a video on the display 108 by performing a wearer input in the form of an "air click" hand gesture 118, while directing the gaze vector 114 at the location 116 on the display that corresponds to the user interface object 112C. The HMD 104 may recognize the "air click" as a hand gesture. For example, the HMD 104 may recognize the hand gesture based on images obtained via the outward-facing camera. In response to recognizing the hand gesture, the HMD 104 may send, via a communication interface of the HMD 104, a control signal to the computing device 106. The control signal may indicate the location 116 at which the gaze vector 114 intersects the display 108. The control signal may be usable by the computing device 106 to adjust operation of the computing device 106 and/or the display 108.

In some implementations, the hand need not intersect the gaze vector 114 while the hand gesture is being performed in order for the HMD 104 to send the control signal to the computing device 106. For example, the wearer may perform the hand gesture with the hand positioned off to the side so as not to occlude the display 108 from the perspective of an eye of the wearer. In this case, the gaze vector may be relied upon to determine the intent of the wearer 102 without consideration of a hand position.

The air click hand gesture is presented as an example, and is not intended to be limiting. Any suitable gesture may be performed by a wearer of an HMD to virtually interact with a user interface of a display of a computing device.

In some implementations, the HMD 104 may be configured to send the control signal to the computing device 106 in response to the location being occluded by at least a portion of the hand from the perspective of an eye of the wearer. For example, the wearer 102 may position a hand so as to occlude the location 116 at which the gaze vector 114 intersects the display 108 from the perspective of an eye of the wearer. In other words, the wearer may appear to point at the user interface object 112C from the perspective of an eye of the wearer. Such occlusion may trigger the user input, or the user input may be triggered by an air click gesture or other signal from the wearer.

As shown in FIG. 1B, the control signal causes the display 108 to adjust visual presentation of the user interface 110. In particular, the display 108 visually presents a graphic 120 indicating selection of the user interface object 112C in response to receiving the control signal from the HMD 104. The graphic 120 may provide visual feedback to the wearer 102 that the air click or other wearer input was recognized by the HMD 104 and effected control over the computing device 106. Subsequently, the computing device 106 may cause a video to be visually presented via the display 108 in response to selection of the user interface object 112C. As shown in FIG. 1C, subsequent to the graphic 120 being visually presented via the display 108, the display 108 visually presents a video 122 corresponding to the user interface object 112C selected by the wearer 102 via the HMD 104.

In the above described example, the HMD 104 need not have knowledge of the user interface 110 in order to provide control functionality to the computing device 106. Instead, the HMD 104 may provide a "generic" input or trigger event along with information corresponding to the location 116 at which the gaze vector 114 intersects the display 108 to the computing device 106. In one example, the generic input may be analogous to a control signal from a user input device, such as a mouse click or a button on a game controller. In another example, the generic input may not correspond to any sort of user input device. Further, the computing device 106 may include a listener or translation component (e.g., a user input API) that is configured to recognize the generic input received from the HMD 104, and map the generic input to a specific command based on the context of the user interface 110 and/or an operating state of the computing device 106. The generic input may correspond to any suitable input that may be recognizable by the listener component of the computing device 106.

The control signal sent from the HMD 104 to the computing device 106 in response to recognizing the wearer input may provide information in any suitable form allowing computing device 106 to appropriately respond to the intentions of the user 102. For example, the location 116 at which the gaze vector 114 intersects the display 108 may be indicated in various forms. In some implementations, the control signal may indicate a display address (e.g., pixel coordinates) at which the gaze vector intersects the display. To facilitate such an implementation, for example, the HMD 104 and the computing device 106 may be paired prior to the HMD 104 sending the control signal to the computing device 106. As a result of the pairing process, the HMD 104 may be provided with information about the display 108, such as the dimensions of the display that may be used by the HMD 104 to derive the display address that corresponds to the location 116 at which the gaze vector 114 intersects the display 108.

In some implementations, the control signal may indicate a relative display height and a relative display width at which the gaze vector intersects the display. For example, the location 116 may be indicated as being located 80% down the height of the display 108 as measured from a top of the display 108 and 20% across the display 108 as measured from a left side of the display 108. To facilitate such an implementation, for example, the HMD 104 may determine a display size based on images of the display 108 obtained via the outward-facing camera. Further, in such an implementation, the computing device 106 may perform additional operations to map the relative height and width indicated by the control signal into a display address.

Furthermore, in some implementations, the control signal may indicate an input event or operation that is mapped to the recognized wearer input. For example, the control signal may indicate a click event, and the computing device 106 may map the click event in combination with the location to a particular operation. In the illustrated example, the computing device 106 maps the click event at the location 116 to an operation to select the user interface object 112C, which further causes a video to be visually presented on the display 108.

In some implementations, the HMD 104 may map the wearer input and the location at which the gaze vector intersects the display to an adjustment command or operation and indicate this adjustment command or operation via the control signal. In the illustrated example, the HMD 104 may send a control signal indicating a play video command to the computing device 106 based on the HMD 104 recognizing that the wearer input selected the user interface object 112C. To facilitate such an implementation, for example, the HMD 104 and the computing device 106 may be paired prior to the HMD 104 sending the control signal to the computing device 106. As a result of the pairing process, the HMD 104 may be provided with information about the user interface 110, such as the operations that are mapped to the plurality of different user interface objects 112 and/or display locations. In another example, the control signal may indicate a user interface object that is selected by the wearer input, and the HMD 104 may perform the operation (e.g., play a video) that is mapped to the user interface object.

Figure 2:
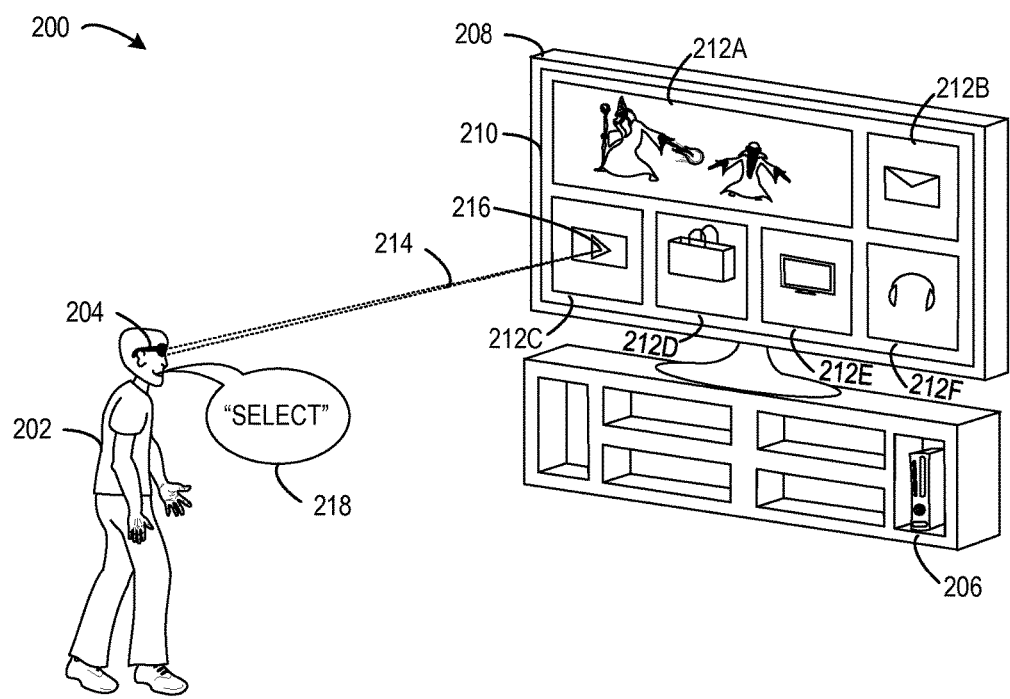
FIG. 2 shows an example interaction of a user providing a voice command that is recognized by an augmented-reality device to control a different device.

FIG. 2 shows another example interaction of a user providing natural user input in the form of a voice command that is recognized by an augmented-reality device to control a different device in a physical space. In particular, a physical space 200 includes a user 202 that is wearing an HMD 204. The physical space 200 further includes a computing device 206 configured to control visual presentation of a display 208. The display 208 visually presents a user interface 210 including a plurality of user interface objects 212 (e.g., 212A, 212B, 212C, 212D, 212E, 212F).

In this example, the user (or wearer) 202 may virtually interact with the user interface 210 via natural user input in the form of a combination of eye gaze and a voice command Such natural user input may be recognized, via various sensing componentry of the HMD 204. In particular, the HMD 204 may include a gaze detector that determines a gaze vector 214 of an eye of the wearer 202. The HMD 204 may include an outward-facing camera that images the physical space 200. The HMD 204 may determine a location 216 at which the gaze vector 214 intersects the display 208 based on images obtained via the camera. The HMD 204 may include one or more microphones to capture wearer audio data. The HMD 204 may be configured to recognize voice commands spoken by the wearer from the wearer audio data captured by the one or more microphones. Various componentry of the HMD will be discussed in further detail below with reference to FIG. 5.

As shown in FIG. 2, the wearer 202 may express an intent to play a video on the display 208 by performing a wearer input in the form of speaking a "SELECT" voice command 218, while directing the gaze vector 214 at the location 216 on the display that corresponds to the user interface object 212C. The HMD 204 may recognize the phrase "SELECT" as a voice command. In response to recognizing the voice command 218, the HMD 204 may send, via a communication interface, a control signal to the computing device 206. The control signal may indicate the location 216 at which the gaze vector 214 intersects the display 208. The control signal may be usable by the computing device 206 to adjust operation of the computing device 206 and/or the display 208. For example, the computing device 206 may use the location 216 to determine which video corresponds to a user interface object positioned on the user interface 210 at the location 216.

In this example, the "SELECT" voice command 218 may correspond to a generic input or trigger event in that the HMD 104 need not have any knowledge of an operating state of the computing device 206 and/or the display 208 in order to send the control signal to the computing device 206.

In other examples, the HMD 204 may have some level of knowledge of the operating state of the computing device 206 and/or the display 208 that may allow the HMD 204 to send control signals/commands that are more complex or context specific responsive to recognizing a given voice command.

The "SELECT" voice command is presented as an example, and is not intended to be limiting. Any suitable voice command may be performed by a wearer of an HMD to virtually interact with a user interface of a display of a computing device.

In the examples of FIGS. 1A-1B and 2, a user virtually interacts with a single display of a single computing device via natural user input that is recognized by an augmented-reality device. In such examples, the HMD need not have full knowledge of the user interface being visually presented by the other computing device in order to provide such functionality. However, as mentioned above, in some implementations, a user may virtually interact with a plurality of different displays of different computing devices. FIGS. 3A-3D show an example of such an interaction. In such an interaction, the HMD may have more knowledge of the operating state and/or capabilities of the plurality of different computing devices in order to provide such an interaction. In particular, FIGS. 3A-3D show an example physical space 300 in which a user 302 is wearing an HMD 304. The HMD 304 provides the user 302 with a see-through field of view (FOV) 306 of the physical space 300. Because the HMD 304 is mounted on the user's head, the FOV 306 of the physical space 300 may change as a pose of the user's head changes.

The physical space 300 may include a plurality of real-world display devices 308 (e.g., 308A, 308B, 308C, 308D) that may be visible to the user 302 within the FOV 306 of the HMD 304. Furthermore, the plurality of real-world display devices 308 may be visible to other users in the physical space 300 that are not using an augmented-reality device to view the physical space 300.

The HMD 304 may be in communication with each of the plurality of display devices 308 and/or computing devices controlling the display devices, via a communication interface, in order to translate user input provided by the wearer 302 into controls signals to adjust operation of the plurality of display devices 308 and/or corresponding computing devices. For example, the HMD 304 and the plurality of display devices 308 may be connected to a local-area network (e.g., WiFi). In another example, the HMD 304 may be individually paired with each of the plurality of display devices 308 via a shortwave-radio network (e.g., Bluetooth). In some implementations, the pairing process may include the HMD 304 receiving display information (e.g., display dimensions, display capabilities, and other display parameters) about the plurality of display devices 308 and/or information about the associated computing devices that may be used by the HMD 304 to send appropriate control signals to particular display devices.

Furthermore, each of the plurality of display devices 308 may include a listener or translation component (e.g., a user input API) that may be configured to recognize, translate, and/or map control signals/commands received from the HMD 304. In one example, the plurality of computing devices 308 and the HMD 304 may share a same communication platform that allows the listener components of the display devices 308 to recognize control signals/commands received from the HMD 304. For example, the control signals sent by the HMD 304 to the plurality of display devices may have a predetermined message format that may be recognized by the listener components of the display devices 308. In one example, the HMD 304 may have a predetermined list or library of control signals/commands from which the HMD 304 may select a command/control signal to send to a display device, and which may be recognized by the listener component of the display device. In some cases, such predetermined commands may have a level of complexity that is greater than a generic input. For example, the control signal/command may specify a particular operation or sequence of operations to be carried out by the computing device. The plurality of display devices 308 may recognize a control signal/command received from the HMD 304 in any suitable manner.

Figure 3A:
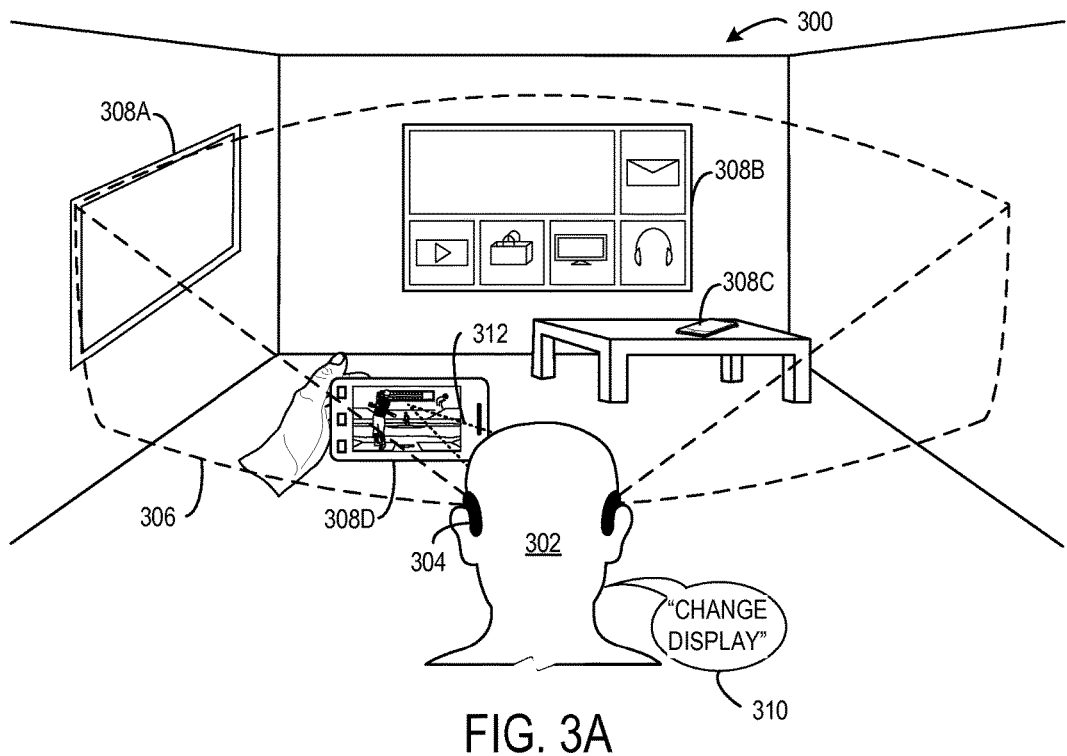
FIGS. 3A-3D show an example interaction of a user moving a user interface object from a first display to a second display by providing natural user input to an augmented-reality device.

In FIG. 3A, the wearer 302 views a baseball game visually presented via a mobile display device (e.g., a smartphone) 308D. Note that other users in the physical space 300 may view the baseball game on the mobile display device 308D without the use of an augmented-reality device.

In this example, the wearer 302 desires to watch the baseball game on a different display device in the physical space 300. As such, the wearer 302 may provide a multi-step wearer input to enact the desired change. In particular, the wearer 302 may speak a "CHANGE DISPLAY" voice command 310, while directing a gaze vector 312 at the mobile display device 308D. By directing the gaze vector 312 at the baseball game while providing the "CHANGE DISPLAY" voice command 310, the wearer 302 indicates an intent to adjust operation of the mobile display device 308D (e.g., by moving the baseball game to a different display device). The HMD 304 may recognize the voice command 310 as a wearer input, and may determine that the gaze vector 312 intersects the mobile display device 308D. Because the gaze vector 312 intersects the mobile display device 308D, the HMD 304 may select the mobile display device 308D from the plurality of candidate display devices 308 as a recipient to receive a control signal indicating a change display command. For example, the control signal may include an adjustment command that causes the mobile computing device 308D to stop visually presenting the baseball game.

The voice command 310 may initiate a "virtual drag and drop" operation in which the baseball game may be moved from one display device to another display device in the physical space 300.

Figure 3B:
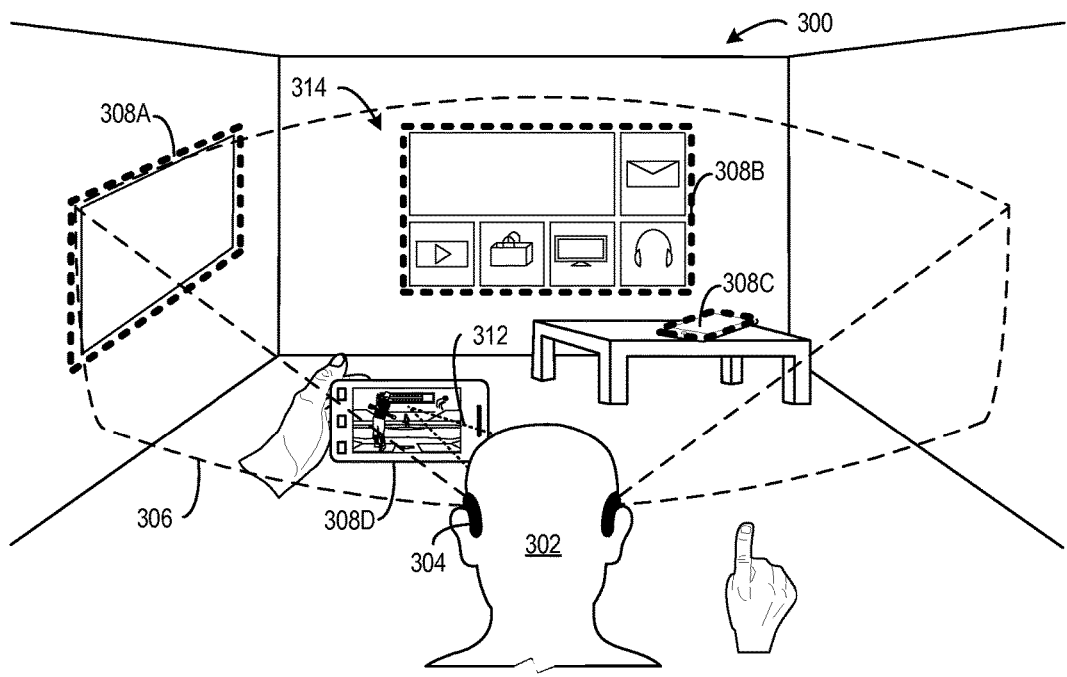

In FIG. 3B, the HMD 304 may visually present, via the see-through display, an augmentation image 314 that highlights the real-world candidate display devices that are eligible to visually present the baseball game. In particular, the augmentation image 314 may include dotted lines surrounding the each of the plurality of candidate display devices 308. In one example, the HMD 304 may recognize the plurality of display devices as candidates based on the display devices being connected to a local network (e.g., a WiFi network) and making availability known via a suitable API or broadcasting mechanism. In some examples, the HMD 304 may recognize the plurality of display devices as candidates based on the devices being associated with the wearer 302 of the HMD 304. For example, the HMD 304 may maintain a list of known devices previously used by or associated with the wearer 302, and the HMD 304 may communicate with the devices in response to such a command sequence being initiated. In some implementations, the candidate display devices may not be identified or highlighted in any manner by the HMD 304. Note that the candidate display devices may only appear highlighted to the wearer 302 via the FOV 306 of the HMD 304. Further, the candidate display devices may not appear highlighted to other users that are viewing the physical space 300 not via an augmented-reality device.

Figure 3C:
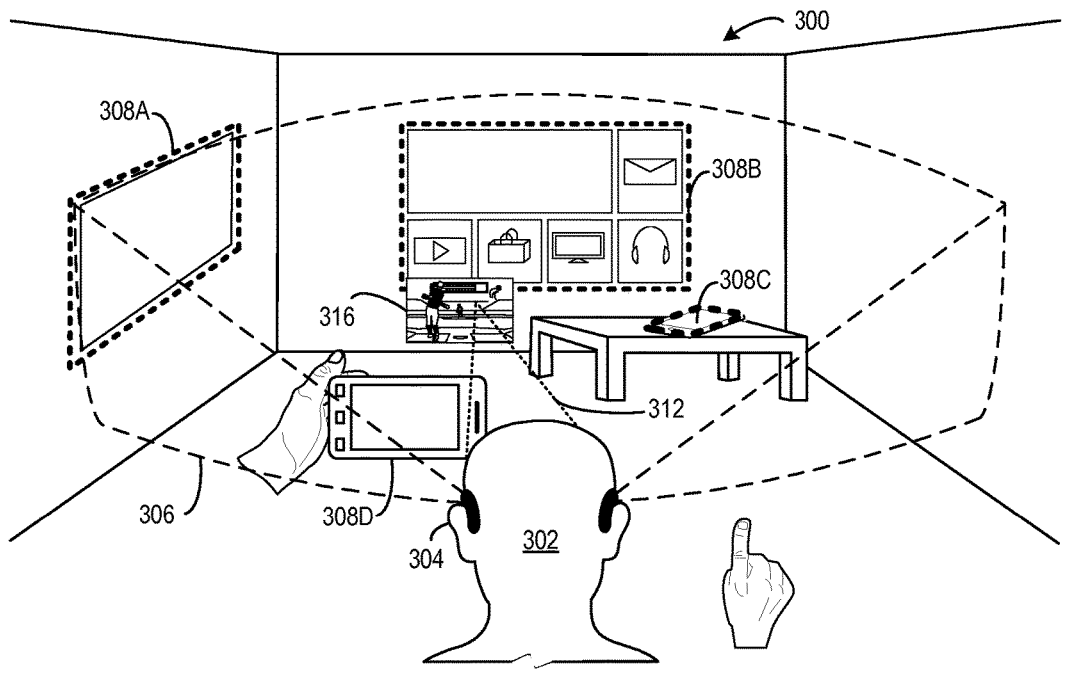

In FIG. 3C, the wearer 302 may shift the gaze vector 312 from the mobile display device 308D towards a large-format display device 308B. In response to movement of the gaze vector 312 away from the mobile display device 308D, the HMD 304 may visually present, via the see-through display, a virtual representation 316 of the baseball game. In one example, the mobile display device 308D may indicate, to the HMD 304, a source (e.g., a television channel) from which the baseball game is being provided in response to the HMD 304 sending the control signal to the mobile display device 308D. Further, the HMD 304 may visually present the baseball game from the indicated source. The mobile display device 308D optionally may provide a timestamp corresponding to a point in the baseball game at which the mobile display device 308D stopped visually presenting the baseball game. The HMD 304 may use the timestamp as a starting point to continue visually presenting the baseball game. Accordingly, the wearer may not miss any of the baseball game while switching between display devices.

In another example, the baseball game may be stored as a media content item of the mobile display device 308D or an available media server, and the mobile display device 308D or available media server may send the media content item to the HMD 304 in response to the HMD 304 sending the control signal to the mobile display device 308D. The HMD 304 may generate the visual representation 316 of the baseball game in any suitable manner.

Continuing with FIG. 3C, the virtual representation 316 of the baseball game may appear to move from the mobile display device 308D to the large-format display device 308B from the perspective of an eye of the user. The virtual representation 316 of the baseball game may follow the gaze vector 312 throughout the physical space 300 as the wearer 302 adjust her/his eye gaze. In some implementations, the virtual representation 316 of the baseball game may include live video. In some implementations, the virtual representation 316 of the baseball game may include a still or freeze frame of the baseball game.

Note that the virtual representation 316 of the baseball game may only be viewed by the wearer 302 via the FOV 306 of the HMD 304.

Figure 3D:
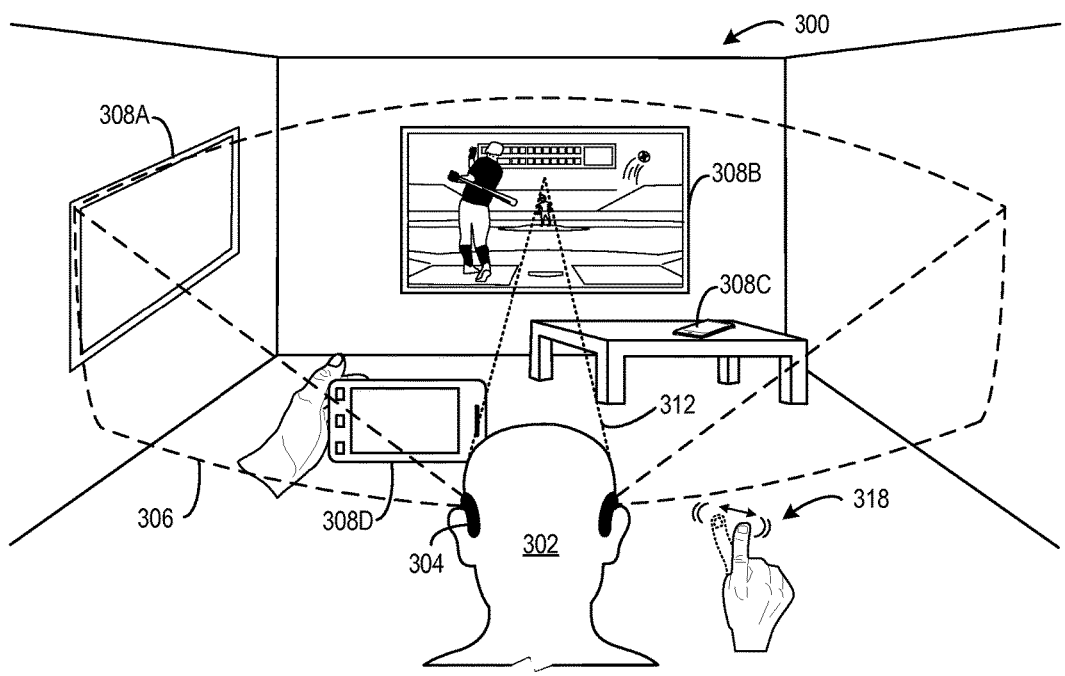

In FIG. 3D, the wearer 302 performs an air click hand gesture 318 while the gaze vector 312 intersects the large-format display 308B to select the large-format display 308B to visually present the baseball game. In response to recognizing the second air click hand gesture 318, the HMD 304 sends a control signal to the large-format display 308B. For example, the control signal 308B may include an adjustment command that causes the large-format display 308B to visually present the baseball game. The air click hand gesture 318 may indicate an end of the virtual drag and drop sequence. As such, the HMD 304 may stop visually presenting the virtual representation 316 of the baseball game responsive to the second air click hand gesture 318.

In some implementations, the control signal may indicate a source (e.g., a television channel) from which the baseball game is being provided to enable the large-format display 308B to visually present the baseball game. For example, the source may be provided from the mobile display device 308D. In some implementations, a media content item (e.g., audio, video, image) may be initially stored on the mobile computing device 308D, and during the course of the virtual drag and drop sequence, the media content item may be sent to the HMD 304, and further sent to the large-format display device 308B to enable the different displays to present the media content item.

The above described interactions are presented as examples and are not intended to be limiting. Moreover, an augmented-reality device may recognize any suitable form of user input to facilitate a virtual interaction between a user and one or more displays of one or more computing devices.

Figure 4:
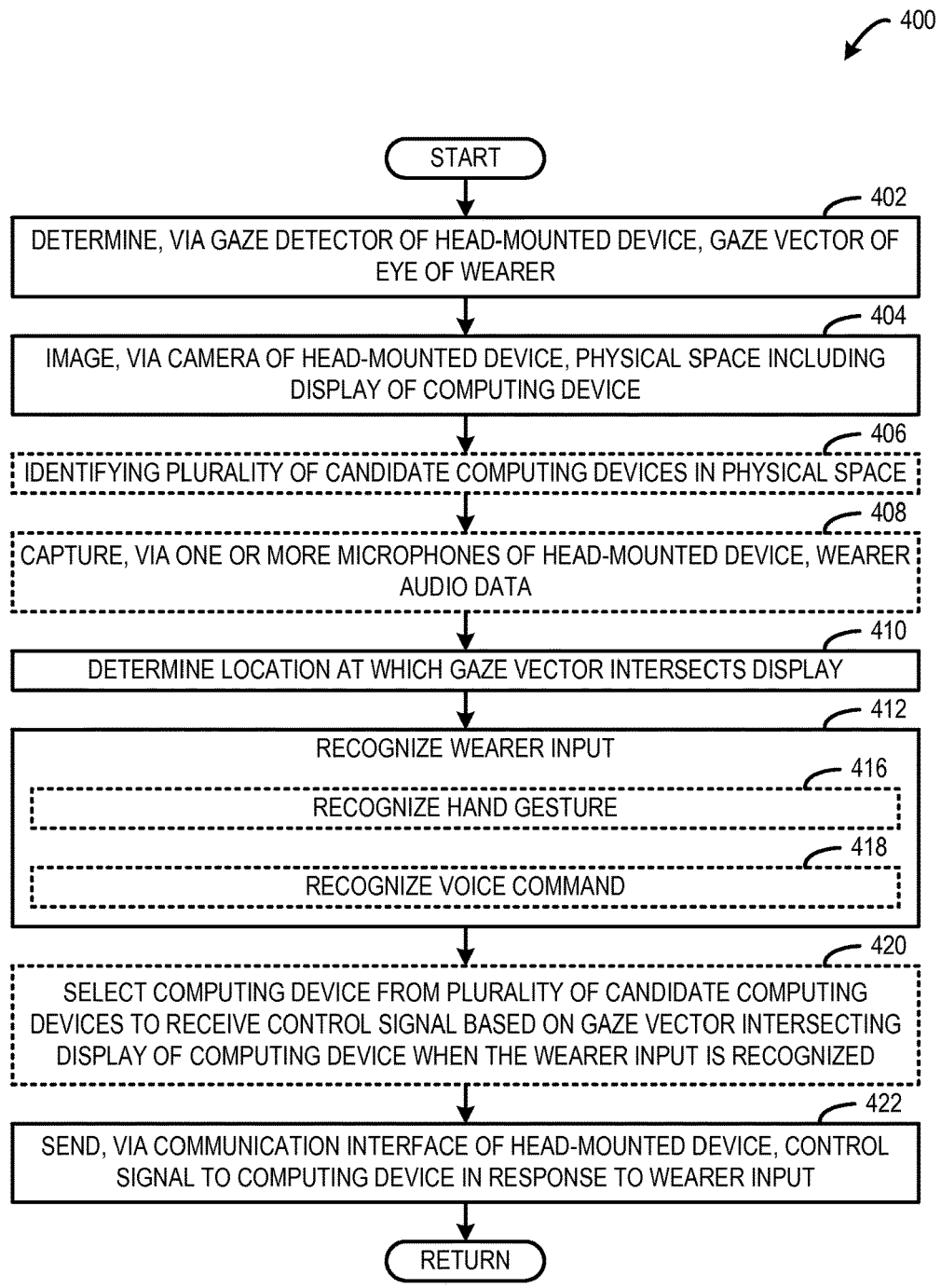
FIG. 4 shows an example method of interacting with a display of a computing device in a physical space by providing natural user input to an augmented-reality device.

FIG. 4 shows an example method 400 of providing user input to an augmented-reality device to virtually interact with a display of a computing device. The method 400 may be performed by the HMD 104 shown in FIGS. 1A-1B, the HMD 204 shown in FIG. 2, the HMD 304 shown in FIGS. 3A-3D, the HMD 500 shown in FIG. 5, or the computing system 600 shown in FIG. 6. In general, the method 400 may be performed by any suitable augmented-reality device.

At 402, the method 400 may include determining, via a gaze detector of the head-mounted device, a gaze vector of an eye of a wearer of the head-mounted device.

At 404, the method 400 may include imaging, via a camera of the head-mounted device, a physical space including a display of a computing device.

In some implementations, at 406, the method 400 optionally may include identifying a plurality of candidate computing devices in the physical space. For example, the candidate computing devices may be controllable via control signals received from the head-mounted device. In some implementations, the candidate computing devices may be identified via images provided from the camera of the head-mounted device. In some implementations, the candidate computing devices may be identified by performing a pairing process with the head-mounted device.

In some implementations, at 408, the method 400 optionally may include capturing, via one or more microphones of the head-mounted device wearer audio data. For example, wearer audio data may include words spoken by the wearer of the head-mounted device.

At 410, the method 400 may include determining a location at which the gaze vector intersects a display of a computing device.

At 412, the method 400 may include recognizing a wearer input. In some implementations, at 416, the method 400 optionally may include recognizing a hand gesture as wearer input. For example, the hand gesture may be recognized based on images provided by the camera of the head-mounted device. In some implementations, at 418, the method 400 optionally may include recognizing a voice command. For example, the voice command may be recognized based on wearer audio data captured via the one or more microphones of the head-mounted device. Any suitable form of use input may be recognized as wearer input without departing from the scope of the present disclosure. For example, wearer input may include actuating a button or another control of the head-mounted device.

In some implementations where a plurality of candidate computing devices are identified, at 420, the method 400 optionally may include selecting a computing device from the plurality of candidate computing device to receive a control signal based on the gaze vector intersecting a display of the computing device when the wearer input is recognized.

At 422, the method 400 may include sending, via a communication interface of the head-mounted device, a control signal to the computing device in response to the wearer input. The control signal may indicate a location at which the gaze vector intersects the display. The control signal may be useable by the computing device to adjust operation of the computing device. For example, the control signal may cause the display to change visual presentation of a user interface.

Figure 5:
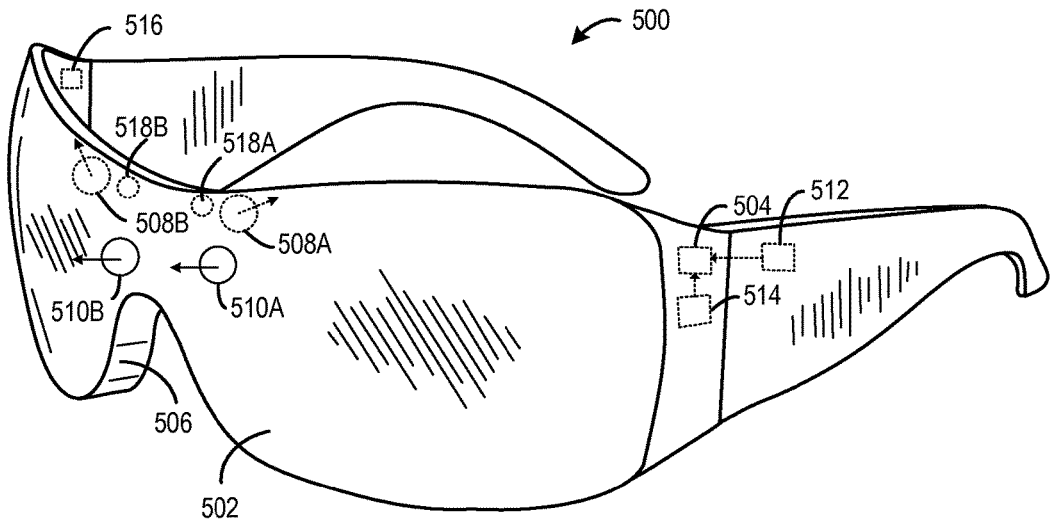
FIG. 5 shows an example head-mounted, see-through display device.

FIG. 5 shows a non-limiting example of a head-mounted, near-eye, see-through display system, also referred to as an HMD 500, in the form of wearable glasses with a see-through display 502. For example, the HMD 500 may be a non-limiting example of the HMD 104 of FIG. 1A, the HMD 204 of FIG. 2, the HMD 304 of FIGS. 3A-3D, and/or the computing system 600 of FIG. 6. An HMD may take any other suitable form in which a transparent, semi-transparent, and/or non-transparent display is supported in front of a viewer's eye or eyes. Further, implementations described herein may be used with any other suitable computing device, including but not limited to mobile computing devices, laptop computers, desktop computers, tablet computers, other wearable computers, etc.

The HMD 500 includes a see-through display 502 and a controller 504. The controller 504 may be configured to perform various operations related to eye gaze detection, user input recognition, visual presentation of augmented-reality images on the see-through display 502, and other operation described herein.

The see-through display 502 may enable images such as augmented-reality images (also referred to as augmentation images or holograms) to be delivered to the eyes of a wearer of the HMD 500. The see-through display 502 may be configured to visually augment an appearance of a real-world, physical environment to a wearer viewing the physical environment through the see-through display 502. Any suitable mechanism may be used to display images via the see-through display 502. For example, the see-through display 502 may include image-producing elements located within lenses 506 (such as, for example, a see-through Organic Light-Emitting Diode (OLED) display). As another example, the see-through display 502 may include a display device (such as, for example a liquid crystal on silicon (LCOS) device or OLED microdisplay) located within a frame of HMD 500. In this example, the lenses 506 may serve as, or otherwise include, a light guide for delivering light from the display device to the eyes of a wearer. Such a light guide may enable a wearer to perceive a 3D holographic image located within the physical environment that the wearer is viewing, while also allowing the wearer to directly view physical objects in the physical environment, thus creating a mixed-reality environment. Additionally or alternatively, the see-through display 502 may present left-eye and right-eye augmented-reality images via respective left-eye and right-eye displays.

The HMD 500 may also include various sensors and related systems to provide information to the controller 504. Such sensors may include, but are not limited to, one or more inward facing image sensors 508A and 508B, one or more outward facing image sensors 510A and 510B, an inertial measurement unit (IMU) 514, and one or more microphones 516. The one or more inward facing image sensors 508A, 508B may be configured to acquire image data in the form of gaze tracking data from a wearer's eyes (e.g., sensor 508A may acquire image data for one of the wearer's eye and sensor 508B may acquire image data for the other of the wearer's eye).

The controller 504 of the HMD 500 may be configured to determine gaze directions of each of a wearer's eyes in any suitable manner based on the information received from the image sensors 508A, 508B. For example, one or more light sources 518A, 518B, such as infrared light sources, may be configured to cause a glint of light to reflect from the cornea of each eye of a wearer. The one or more image sensors 508A, 508B may then be configured to capture an image of the wearer's eyes. Images of the glints and of the pupils as determined from image data gathered from the image sensors 508A, 508B may be used by the controller 504 to determine an optical axis of each eye. Using this information, the controller 504 may be configured to determine a direction the wearer is gazing (also referred to as a gaze vector). The controller 504 may be configured to additionally determine an identity of a physical and/or virtual object at which the wearer is gazing by projecting the user's gaze vector onto a 3D model of the surrounding environment. The one or more light sources 518A, 518B, the one or more inward facing image sensors 508a, 508B, and the controller 504 may collectively represent to a gaze detector configured to determine a gaze vector of an eye of a wearer of the HMD 500. In other implementations, a different type of gaze detector/sensor may be employed in the HMD 500 to measure one or more gaze parameters of the user's eyes. Examples of gaze parameters measured by one or more gaze sensors that may be used by the controller 504 to determine an eye gaze sample may include an eye gaze direction, head orientation, eye gaze velocity, eye gaze acceleration, change in angle of eye gaze direction, and/or any other suitable tracking information. In some implementations, eye gaze tracking may be recorded independently for both eyes of the wearer of the HMD 500.

The one or more outward facing image sensors 510A, 510B may be configured to measure physical environment attributes of the physical environment in which the HMD 500 is located (e.g., light intensity). In one example, image sensor 510A may include a visible-light camera configured to collect a visible-light image of a physical space. Further, the image sensor 510B may include a depth camera configured to collect a depth image of a physical space. More particularly, in one example, the depth camera is an infrared time-of-flight depth camera. In another example, the depth camera is an infrared structured light depth camera.

Data from the outward facing image sensors 510A, 510B may be used by the controller 504 to detect movements within a field of view of the see-through display 502, such as gesture-based inputs or other movements performed by a wearer or by a person or physical object within the field of view. In one example, data from the outward facing image sensors 510A, 510B may be used to detect a wearer input performed by the wearer of the HMD, such as a gesture (e.g., a pinching of fingers, closing of a fist, etc.), that indicates a virtual interaction with a user interface visually presented via a display of a computing device in the physical space. Data from the outward facing image sensors 510A, 510B may be used by the controller 504 to determine direction/ location and orientation data (e.g., from imaging environmental features) that enables position/motion tracking of the HMD 500 in the real-world environment. Data from the outward facing image sensors 510A, 510B may be used by the controller 504 to construct still images and/or video images of the surrounding environment from the perspective of the HMD 500.

The controller 504 may be configured to identify surfaces of the physical space in any suitable manner. In one example, surfaces of the physical space may be identified based on depth maps derived from depth data provide by the depth camera 510B. In another example, the controller 504 may be configured to generate or update a three-dimensional model of the physical using information from outward facing image sensors 510A, 510B. Additionally or alternatively, information from outward facing image sensors 510A, 51B may be communicated to a remote computer responsible for generating and/or updating a model of the physical space. In either case, the relative position and/or orientation of the HMD 500 relative to the physical space may be assessed so that augmented-reality images may be accurately displayed in desired real-world locations with desired orientations. In one example, the controller 504 may be configured to perform simultaneous localization and mapping (SLAM) of a physical space using information provided by a surface sensor, alone or in combination with other sensors of the HMD 500. In particular, the controller 504 may be configured to generate a 3D model of the physical space including surface reconstruction information that may be used to identify surfaces in the physical space.

In some implementations, the HMD 500 may identify different displays of different computing devices in the physical space based on images provided from the outward facing cameras 510A and 510B.

The IMU 514 may be configured to provide position and/or orientation data of the HMD 500 to the controller 504. In one implementation, the IMU 514 may be configured as a three-axis or three-degree of freedom (3DOF) position sensor system. This example position sensor system may, for example, include three gyroscopes to indicate or measure a change in orientation of the HMD 500 within 3D space about three orthogonal axes (e.g., roll, pitch, and yaw). The orientation derived from the sensor signals of the IMU may be used to display, via the see-through display, one or more AR images with a realistic and stable position and orientation.

In another example, the IMU 514 may be configured as a six-axis or six-degree of freedom (6DOF) position sensor system. Such a configuration may include three accelerometers and three gyroscopes to indicate or measure a change in location of the HMD 500 along three orthogonal spatial axes (e.g., x, y, and z) and a change in device orientation about three orthogonal rotation axes (e.g., yaw, pitch, and roll). In some implementations, position and orientation data from the outward facing image sensors 510A, 510B and the IMU 514 may be used in conjunction to determine a position and orientation (or 6DOF pose) of the HMD 500.

The HMD 500 may also support other suitable positioning techniques, such as GPS or other global navigation systems. Further, while specific examples of position sensor systems have been described, it will be appreciated that any other suitable sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

The HMD 500 may include a communication interface 512 configured to communicate with other computing devices. The communication interface 512 may include any suitable communication componentry including wired and/ or wireless communication devices compatible with one or more different communication protocols/standards (e.g., WiFi, Bluetooth). In some implementations, the communication interface 512 may be configured to send control signals to a computing device to adjust operation of the computing device in order to facilitate a virtual interaction of a wearer of the HMD with the computing device.

Figure 6:
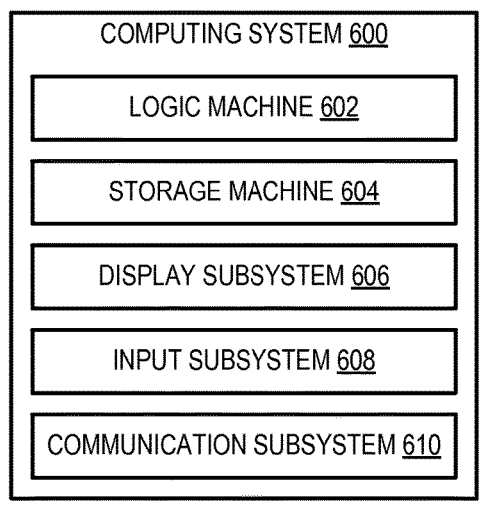
FIG. 6 shows an example computing system.

The controller 504 may include a logic machine and a storage machine, discussed in more detail above with respect to FIG. 6, in communication with the display and the various sensors of the HMD 500.

In some implementations, the methods and processes described herein may be tied to a computing system of one or more computing devices. In particular, such methods and processes may be implemented as a computer-application program or service, an application-programming interface (API), a library, and/or other computer-program product.

FIG. 6 schematically shows a non-limiting implementation of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), augmented-reality devices, HMDs, and/or other computing devices. For example, the computing system 600 may be a non-limiting example of the HMD 104 of FIG. 1A, the mobile computing device 204 of FIG. 2, and/or the HMD 500 of FIG. 5.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine 602 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 602 may include one or more processors configured to execute software instructions. Additionally or alternatively, the logic machine 602 may include one or more hardware or firmware logic machines configured to execute hardware or firmware instructions. Processors of the logic machine 602 may be single-core or multi-core, and the instructions executed thereon may be configured for sequential, parallel, and/or distributed processing. Individual components of the logic machine 602 optionally may be distributed among two or more separate devices, which may be remotely located and/or configured for coordinated processing. Aspects of the logic machine 602 may be virtualized and executed by remotely accessible, networked computing devices configured in a cloud-computing configuration.

Storage machine 604 includes one or more physical devices configured to hold instructions executable by the logic machine 602 to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some implementations, the communication subsystem may allow computing system 600 to send and/or receive messages to and/or from other devices via a network such as the Internet.

In another example implementation, an augmented reality head-mounted device comprises a gaze detector to determine a gaze vector of an eye of a wearer of the augmented reality head-mounted device, a camera to image a physical space including a display of a computing device, and a communication interface to send a control signal to the computing device in response to a wearer input, the control signal indicating a location at which the gaze vector intersects the display and being useable by the computing device to adjust operation of the computing device. In one example implementation that optionally may be combined with any of the features described herein, the location at which the gaze vector intersects the display corresponds to a user interface object of a user interface visually presented via the display. In one example implementation that optionally may be combined with any of the features described herein, the control signal causes selection of the user interface object. In one example implementation that optionally may be combined with any of the features described herein, the control signal indicates the user interface object. In one example implementation that optionally may be combined with any of the features described herein, the control signal indicates a display address at which the gaze vector intersects the display. In one example implementation that optionally may be combined with any of the features described herein, the control signal indicates a relative display height and a relative display width at which the gaze vector intersects the display. In one example implementation that optionally may be combined with any of the features described herein, the control signal includes an adjustment command for adjusting operation of the computing device. In one example implementation that optionally may be combined with any of the features described herein, the control signal causes the display to change visual presentation of the user interface. In one example implementation that optionally may be combined with any of the features described herein, the location is a first location, the user interface is a first user interface, the display is a first display, the computing device is a first computing device, the control signal is a first control signal, and the communication interface is configured to send a second control signal to a second computing device in response to a second wearer input while the gaze vector intersects a second display of the second computing device, the second control signal being useable by the second computing device to adjust operation of the second computing device. In one example implementation that optionally may be combined with any of the features described herein, the first control signal causes selection of a user interface object of a first user interface visually presented via the first display, and the second control signal causes the user interface object to be visually presented on a second user interface visually presented via the second display of the second computing device. In one example implementation that optionally may be combined with any of the features described herein, the augmented reality head-mounted device further comprises a see-through display to visually present the user interface object moving between the first display and the second display. In one example implementation that optionally may be combined with any of the features described herein, the augmented reality head-mounted device further comprises one or more microphones to capture wearer audio data, and the wearer input includes a voice command. In one example implementation that optionally may be combined with any of the features described herein, the wearer input includes a hand gesture. In one example implementation that optionally may be combined with any of the features described herein, at least a portion of a hand of the wearer occludes the location at which the gaze vector intersects the display from a perspective of the eye while performing the hand gesture, and the control signal is sent to the computing device in response to the location being occluded by at least the portion of the hand from the perspective of the eye while the hand gesture is being performed.

In another example implementation, on an augmented reality head-mounted device, a method of interacting with a display of a computing device in a physical space comprises determining, via a gaze detector of the augmented reality head-mounted device, a gaze vector of an eye of the wearer, imaging, via a camera of the augmented reality head-mounted device, a physical space including a display of a computing device, determining a location at which the gaze vector intersects the display, recognizing a wearer input, and sending, via a communication interface of the augmented reality head-mounted device, a control signal to the computing device in response to the wearer input, the control signal indicating a location at which the gaze vector intersects the display and being useable by the computing device to adjust operation of the computing device. In one example implementation that optionally may be combined with any of the features described herein, the control signal causes the display to change visual presentation of the user interface. In one example implementation that optionally may be combined with any of the features described herein, the location at which the gaze vector intersects the display corresponds to a user interface object of a user interface visually presented via the display, and the control signal causes the display to visually indicate selection of the user interface object. In one example implementation that optionally may be combined with any of the features described herein, the method further comprises capturing, via one or more microphones of the augmented reality head-mounted device, wearer audio data, and the wearer input includes a voice command.

In one example implementation that optionally may be combined with any of the features described herein, the wearer input includes a hand gesture, at least a portion of a hand of the wearer occludes the location at which the gaze vector intersects the display from a perspective of the eye while performing the hand gesture, and the control signal is sent to the computing device in response to the location being occluded by at least the portion of the hand from the perspective of the eye while the hand gesture is being performed.

In another example implementation, an augmented reality head-mounted device comprises a gaze detector to determine a gaze vector of an eye of a wearer of the augmented reality head-mounted device, a camera to image a physical space including a plurality of candidate computing devices, and a communication interface to send a control signal to a computing device selected from the plurality of candidate computing devices in response to a wearer input, the computing device being selected from the plurality of candidate computing devices to receive the control signal based on the eye gaze vector of the wearer intersecting a display of the computing device when the wearer input is performed, the control signal indicating a location at which the gaze vector intersects the display and being useable by the computing device to adjust operation of the computing device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An augmented reality head-mounted device comprising:
   a gaze detector to determine a gaze vector of an eye of a user of the augmented reality head-mounted device;
   a camera to acquire one or more images of a physical space;
   a communication interface; and
   a controller to:
      identify a display of a computing device in the one or more images,
      establish communication with the computing device via the communication interface such that the augmented-reality head-mounted device is recognized by the computing device as a user input device that communicates according to a predetermined user input device message format of the computing device,
      recognize a coordinate space of the display,
      determine a display location at which the gaze vector intersects the display in the coordinate space of the display,
      recognize a user input separate from eye gaze while the gaze vector intersects the display location, and
      send, via the communication interface, a control signal to the computing device based on the user input, the control signal indicating the display location in the coordinate space of the display at which the gaze vector intersects the display at a time of the user input in the predetermined user input device message format recognizable by the computing device and useable by the computing device to adjust operation of the computing device.

2. The augmented reality head-mounted device of claim 1, wherein the display location at which the gaze vector intersects the display corresponds to a user interface object of a user interface visually presented via the display.

3. The augmented reality head-mounted device of claim 2, wherein the control signal causes selection of the user interface object.

4. The augmented reality head-mounted device of claim 2, wherein the control signal indicates the user interface object.

5. The augmented reality head-mounted device of claim 1, wherein the control signal indicates a display address at which the gaze vector intersects the display.

6. The augmented reality head-mounted device of claim 1, wherein the control signal indicates a relative display height and a relative display width at which the gaze vector intersects the display.

7. The augmented reality head-mounted device of claim 1, wherein the control signal includes an adjustment command for adjusting operation of the computing device.

8. The augmented reality head-mounted device of claim 1, wherein the control signal causes the display to change visual presentation of the user interface.

9. The augmented reality head-mounted device of claim 1, wherein the display location is a first display location, wherein the display is a first display, wherein the computing device is a first computing device, wherein the control signal is a first control signal, and wherein the controller is configured to identify a second display of a second computing device in the one or more images, establish communication with the second computing device via the communication interface, determine a second display location at which the gaze vector intersects the second display, recognize a second user input separate from eye gaze while the gaze vector intersects the second display location, and send, via the communication interface, a second control signal to the second computing device in response to recognizing the second user input, the second control signal indicating the second display location in a predetermined user input device message format recognizable by the second computing device and useable by the second computing device to adjust operation of the second computing device.

10. The augmented reality head-mounted display of claim 9, wherein the first control signal causes selection of a user interface object of a first user interface visually presented via the first display, and the second control signal causes the user interface object to be visually presented on a second user interface visually presented via the second display of the second computing device.

11. The augmented reality head-mounted device of claim 10, further comprising:
   a see-through display to visually present the user interface object moving between the first display and the second display.

12. The augmented reality head-mounted device of claim 1, further comprising:
   one or more microphones to capture user audio data; and
   wherein the user input includes a voice command.

13. The augmented reality head-mounted device of claim 1, wherein the user input includes a hand gesture.

14. The augmented reality head-mounted device of claim 13, wherein at least a portion of a hand of the user occludes the location at which the gaze vector intersects the display from a perspective of the eye while performing the hand gesture, and wherein the control signal is sent to the computing device in response to the location being occluded by at least the portion of the hand from the perspective of the eye while the hand gesture is being performed.

15. On an augmented reality head-mounted device, a method of controlling a display of a computing device in a physical space, the method comprising:
   determining, via a gaze detector of the augmented reality head-mounted device, a gaze vector of an eye of a user;
   acquiring, via a camera of the augmented reality head-mounted device, one or more images of the physical space;
   identifying the display in the one or more images;
   establishing communication with the computing device via a communication interface of the augmented reality head-mounted device such that the augmented-reality head-mounted device is recognized by the computing device as a user input device that communicates according to a predetermined user input device message format of the computing device;
   recognizing a coordinate space of the display;
   determining a display location at which the gaze vector intersects the display in the coordinate space of the display;
   recognizing a user input separate from eye gaze; and
   sending, via the communication interface, a control signal to the computing device in response to the user input, the control signal indicating the display location in the coordinate space of the display at which the gaze vector intersects the display in the predetermined user input device message format recognizable by the computing device and useable by the computing device to adjust operation of the computing device.

16. The method of claim 15, wherein the control signal causes the display to change visual presentation of the user interface.

17. The method of claim 15, wherein the location at which the gaze vector intersects the display corresponds to a user interface object of a user interface visually presented via the display, and wherein the control signal causes the display to visually indicate selection of the user interface object.

18. The method of claim 15, further comprising:
capturing, via one or more microphones of the augmented reality head-mounted device, user audio data; and
wherein the user input includes a voice command.

19. The method of claim 15, wherein the user input includes a hand gesture, wherein at least a portion of a hand of the user occludes the location at which the gaze vector intersects the display from a perspective of the eye while performing the hand gesture, and wherein the control signal is sent to the computing device in response to the location being occluded by at least the portion of the hand from the perspective of the eye while the hand gesture is being performed.

20. An augmented reality head-mounted device comprising:
a gaze detector to determine a gaze vector of an eye of a user of the augmented reality head-mounted device;
a camera to acquire one or more images of a physical space;
a communication interface; and
a controller to identify a plurality of candidate displays of a plurality of computing devices in the one or more images, establish communication with the plurality of computing devices via the communication interface such that the augmented-reality head-mounted device is recognized by each of the plurality of computing devices as a user input device that communicates according to a predetermined user input device message format of that computing device, recognize a coordinate space of each of the plurality of candidate displays, determine a display location at which the gaze vector intersects a candidate display of the plurality of candidate displays in the coordinate space of the candidate display, recognize a user input separate from eye gaze while the gaze vector intersects the display location, and send, via the communication interface, a control signal to a computing device associated with the candidate display in response to recognizing the user input, the control signal indicating the display location in the coordinate space of the candidate display at which the gaze vector intersects the candidate display in the predetermined user input device message format recognizable by the computing device and useable by the computing device to adjust operation of the computing device.

* * * * *